March 24, 1959

G. SHAFIRO 2,879,491

PLUG SYSTEM FOR JOINING ELECTRIC SUB-ASSEMBLY TO CHASSIS

Filed Aug. 12, 1954

INVENTOR.
GUSTAVE SHAPIRO

BY

R. I. Tompkins

ATTORNEYS

March 24, 1959
G. SHAPIRO
2,879,491
PLUG SYSTEM FOR JOINING ELECTRIC
SUB-ASSEMBLY TO CHASSIS
Filed Aug. 12, 1954
4 Sheets-Sheet 2
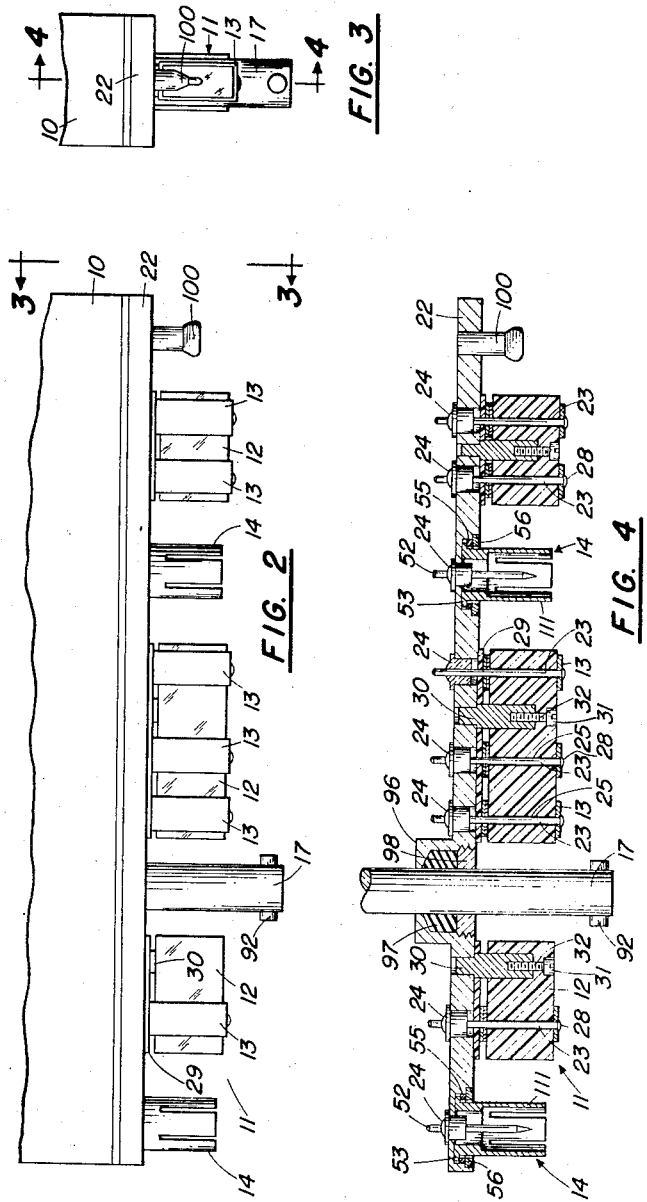
INVENTOR.
GUSTAVE SHAPIRO
BY
R. J. Tompkins
ATTORNEYS March 24, 1959

G. SHAPIRO 2,879,491

PLUG SYSTEM FOR JOINING ELECTRIC SUB-ASSEMBLY TO CHASSIS

Filed Aug. 12, 1954

INVENTOR.
GUSTAVE SHAPIRO
BY
R. J. Tompkins
ATTORNEYS

March 24, 1959
G. SHAPIRO
2,879,491
PLUG SYSTEM FOR JOINING ELECTRIC SUB-ASSEMBLY TO CHASSIS
Filed Aug. 12, 1954
4 Sheets-Sheet 4
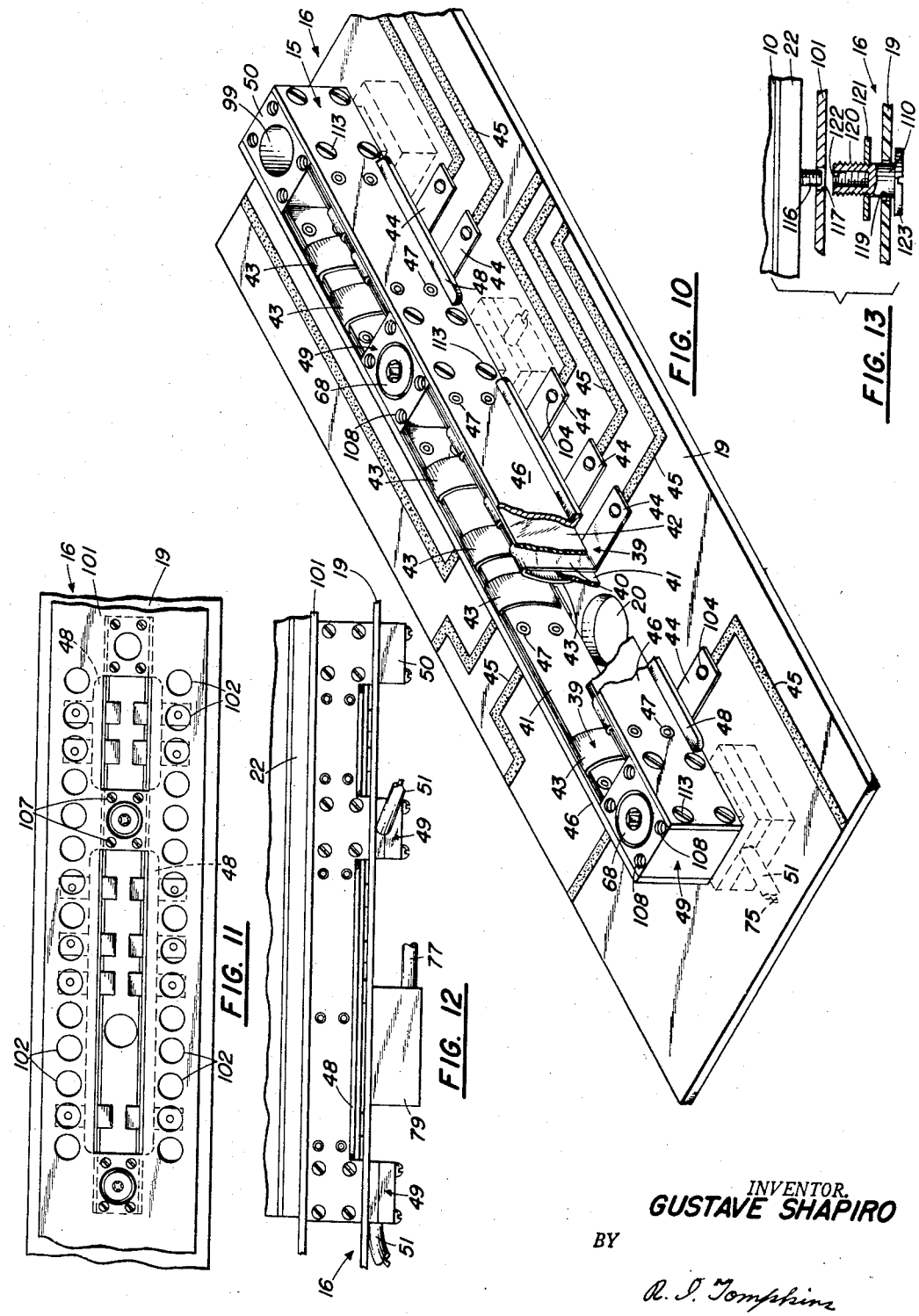
INVENTOR.
GUSTAVE SHAPIRO
BY
*R. J. Tompkins*
ATTORNEYS United States Patent Office 2,879,491
Patented Mar. 24, 1959

2,879,491

PLUG SYSTEM FOR JOINING ELECTRIC SUB-ASSEMBLY TO CHASSIS

Gustave Shapiro, Washington, D.C., assignor to the United States of America as represented by the Secretary of the Navy Application August 12, 1954, Serial No. 449,534

10 Claims. (Cl. 339—17)

(Granted under Title 35, U. S. Code (1952), sec. 266)

The invention described herein may be manufactured and used by or for the Government of the United States of America for governmental purposes without the payment of any royalties thereon or therefor.

This invention relates to an electrical plug system for facilitating the joining of an electronic subassembly with the remainder of an electronic device.

In present day practice it is common to detachably mount a plurality of complete electronic sub-assemblies on an electronic device. However, each sub-assembly often requires a combination of low frequency connections, high frequency connections, and mechanical couplings for transmitting mechanical motion to components within the sub-assembly. In addition, in many applications it is necessary to provide cooling for the entire electronic unit and sub-assemblies to prevent overheating. Furthermore, some technical procedures require that a sub-assembly which is to be mounted on an electronic device be hermetically sealed.

The present invention discloses a plug system which facilitates the assembling and disassembling of an electronic sub-assembly with the remainder of an electronic device where the sub-assembly requires low frequency connections, high frequency connections, and mechanical linkages for transmitting mechanical motion. In this invention these three types of coupling are obtained by the use of a single plug unit. Furthermore, the instant plug system allows the arrangement of these various types of connections to be made in such a manner that extreme flexibility of circuit design can be realized. The instant plug system permits easy cooling of all parts of the electronic device while also allowing a hermetically sealed sub-assembly, which requires the above mentioned types of electrical and mechanical connections for proper operation, to be readily coupled to the remainder of the electronic unit. In fact, the instant invention allows each of the above mentioned features to be realized without sacrificing any of the other features.

It is therefore one objecct of this invention to disclose a plug system which is capable of joining an electronic sub-assembly to the remainder of an electronic device in such a manner that the low frequency connections, high frequency connections, and mechanical linkages between the aforementioned two elements are all connected substantially at the same time with a single plug-in motion.

It is another object of the instant invention to disclose a plug system which allows the units which are joined thereby to be readily cooled.

It is still another object of this invention to disclose a plug system which in addition to accomplishing the foregoing objects is capable of being used with hermetically sealed electronic sub-assemblies.

It is another object of this invention to disclose an electric plug system which allows great flexibility of circuit layout.

It is still a further object of this invention to disclose a plug system which is capable of coupling an electronic sub-assembly to a printed circuit.

It is yet another object of this invention to disclose a plug system which is so constructed as to make possible the fabrication of experimental versions of plugs for special applications without requiring extensive and elaborate tooling.

It is another object of this invention to disclose a coaxial connecting plug which is self-aligning and which can be used where hermetic sealing is required.

Other objects and many of the attendant advantages of this invention will be readily appreciated as the same becomes better understood by reference to the following detailed description when considered in connection with the accompanying drawings, wherein:

Fig. 2 is a side view of the male portion of the plug system.

Fig. 3 is an end view taken on line 3—3 of Fig. 2.

Fig. 4 is a cross sectional view of the male portion of the plug system taken on line 4—4 of Fig. 3.

Fig. 10 is a perspective view showing the details of the female portion of the plug system. This view also shows how this portion of the plug system can be coupled to a printed circuit.

Fig. 11 is a plan view of the plug system which shows how the system is adapted for direct air cooling.

Fig. 12 is a side view of Fig. 11.

Fig. 13 is a view which shows an arrangement for holding the male and female portions of the plug system in assembled relationship.

Reference is now made to the accompanying drawings in which like reference numerals indicate like parts.

Figures 1, 14, 15:
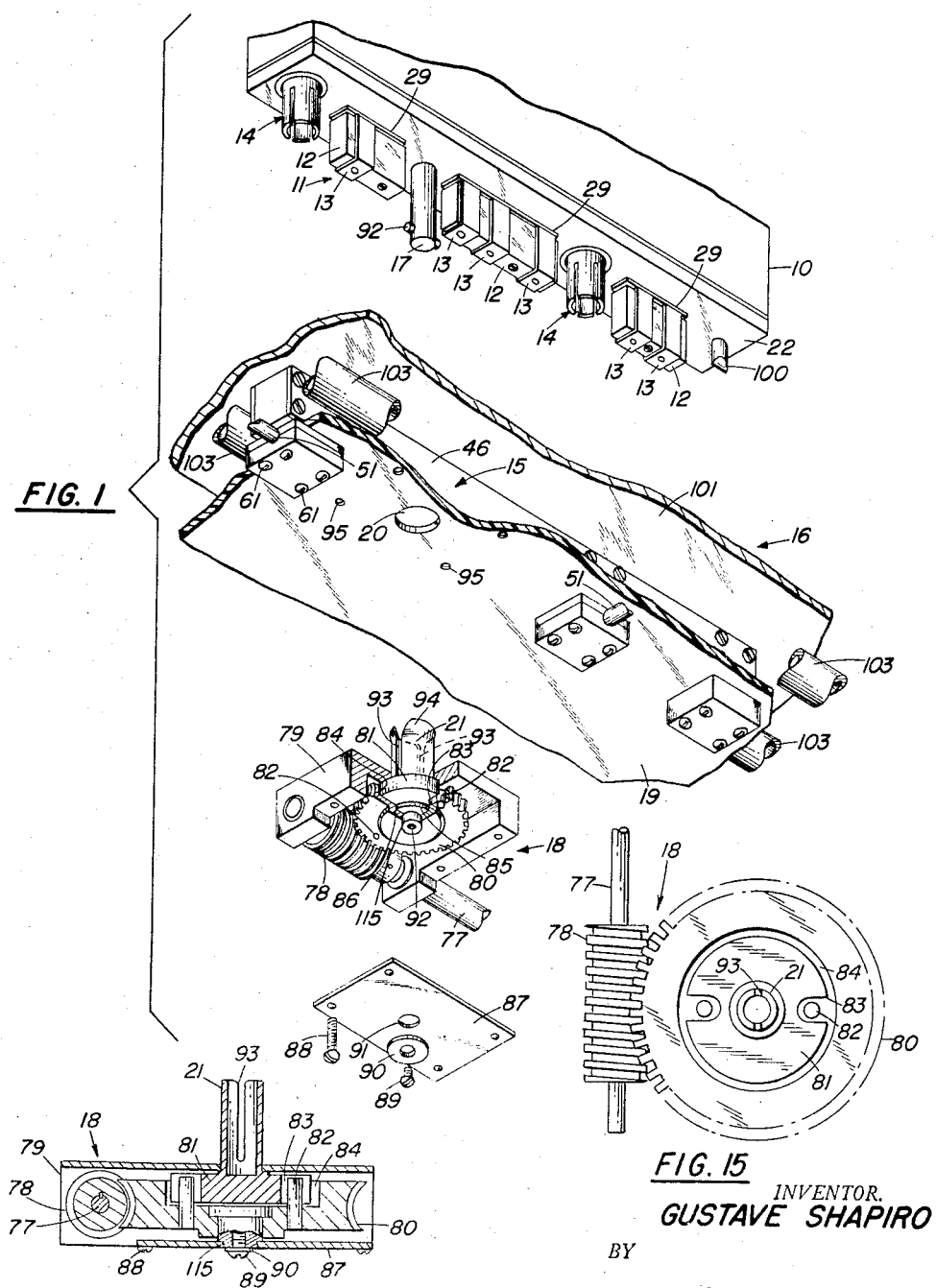
Fig. 1 is an exploded perspective view showing how an electronic sub-assembly is coupled to the remainder of an electronic device.
Fig. 14 is a section view of the mechanical drive shown in Fig. 1.
Fig. 15 is a plan view of the mechanical drive shown in Fig. 1 with the gear housing removed.

In Fig. 1, the essentials of the instant plug system are shown in exploded form. The entire system will be broadly described at this point, and a detailed explanation will be made hereafter. As mentioned above, the plug system is capable of providing (1) low frequency connections, (2) high frequency connections, and (3) a mechanical drive coupling between the main body of an electronic device and an electronic sub-assembly which is adapted to be coupled thereto. Numeral 10 depicts an electronic sub-assembly. Adapted to be affixed thereto is the male portion of the plug system generally designated by numeral 11. This male portion consists of (1) a plurality of plug bars 12 made of a suitable insulating material which serve as a base for contact strips 13 which in turn feed low frequencies to the sub-assembly 10; and (2) coaxial plug assemblies 14 which are adapted to feed high frequencies to the sub-assembly 10; and (3) shaft 17 for transmitting mechanical motion to sub-assembly 10. The male portion 11 is adapted to be plugged into the female portion 15, Figs. 1 and 10, of the plug system which is mounted on the chassis 16 of the electronic device. The female portion 15 contains (1) contact springs 39 which are adapted to engage contact strips 13; (2) coaxial connector blocks 49 which are adapted to mate with coaxial plugs 14; and (3) mechanical drive 18. For transmitting mechanical motion to sub-assembly 10, shaft 17 of sub-assembly 10 is adapted to be driven by drive 18 which is affixed to printed circuit plate 19 of chassis 16 Figs. 1 and 10. The foregoing description has broadly set forth the salient structural features of the instant plug system. A detailed structural description of the instant plug system and its mode of operation will be given hereafter.

Figure 6:
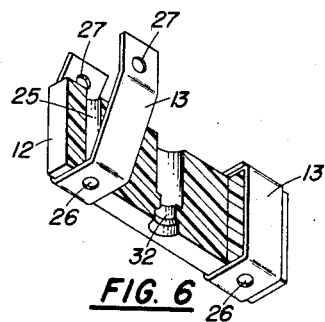
Fig. 6 is a perspective view, partially in cross section, of the low frequency connecting part of the male portion of the plug system.

Reference is now made to Figs. 1, 2, 3, 6 and 7 for a detailed description of the low frequency coupling part of the male portion 11 of the plug system. A metallic base plate 22 is part of the electronic sub-assembly 10. Conducting rods 23 are the center conductors of conventional glass-to-metal feed through seals 24, Fig. 4, and serve the purpose of conducting low frequency electricity from the chassis 16 of the electronic unit to the sub-assembly 10 in a manner to be hereinafter described. It is to be noted at this point, however, that seals 24 in addition to insulating conducting rods 23 from base plate 22 also provide air-tight connections between the aforementioned members in order to allow the electronic unit 10 to be hermetically sealed. A plurality of plug bars 12 having holes 25 formed therein, Figs. 4 and 6, are adapted to be affixed to base plate 22, in such a manner that the conducting rods 23 fit into holes 25. In order to provide electrical contact between the chassis 16 and the sub-assembly 10, contact strips 13, made of silver or any other suitable conductor, are used. Contact strips 13 are formed of a thin strip of metal having a hole 26 formed in its center portion and holes 27 near its ends, Fig. 6. The contact strips 13 are wrapped around the plug bar 12 in such a manner that the holes 26 and 27 align with hole 25 of the plug bar 12. This assembled portion consisting of the plug bar 12 and contact strips 13 is then affixed to the base plate 22 of electronic sub-assembly 10 in such a manner that conducting rods 23, which are affixed to base plate 22, pass through the aligned holes 25, 26, and 27 and thereby hold the contact strips 13 securely on plug bar 12. The ends 28 of the conducting rods 23 are then soldered to contact strips 13. Interposed between base plate 22 and plug bar 13 is an electrical insulating strip 29 composed of a suitable insulating material. As can readily be seen from Fig. 4, insulating strip 29 insulates contact strips 13 from base plate 22. The glass-to-metal seals 24 insulate the conducting rods 23, which are joined to contact strips 13, from base plate 22. Thus low frequencies can be passed from contact strips 13 to the electronic subassembly 10 without being grounded to base plate 22. The plug bar 12 and the insulating strip 29 are joined to the base plate by means of fastening members 30 and bolts 31. Fastening member 30 is suitably affixed to base plate 22 in any desired manner that will provide a hermetic seal. Plug bar 12 has a suitable hole formed therein (not numbered) which accommodates fastening members 30 and also provides shoulders 32 which in combination with the head of threaded bolts 31 and fastening member 30 hold the plug bar 12 and its associated elements in contact with base plate 22.

Figure 7:
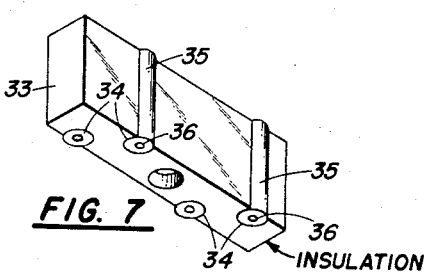
Fig. 7 is a modified arrangement of Fig. 6.

It is to be noted at this point that Fig. 7 discloses plug bar 33 which has a different construction from plug bar 12. Plug bar 33 does not require the contact strips 13. In plug bar 33, recesses 34 are formed in the peripheral portions thereof. These recesses have a circumferential portion which is greater than 180°. Adapted to be held in these recesses 34 are tubular metallic inserts 35. It can readily be seen that these inserts 35 cannot lose contact with recesses 34 by movement in a direction transverse to their longitudinal axes because of the fact that they are in contact with more than 180° of the circumference of recesses 34. Tubular inserts 35 have holes 36 formed therein which are adapted to receive conducting rods 23, Fig. 1. The exposed portions of inserts 35 make wiping contact with the low frequency portions of the female member 15 of the plug system in a manner to be described hereafter. The purpose of this alternate construction is to allow more low frequency contacts to be carried by plug bar 33 per unit of its length than are carried by plug bar 12, Fig. 6.

Figure 8:
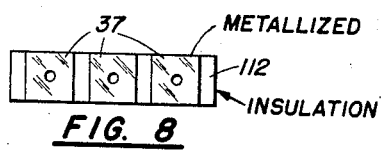
Figs. 8 and 9 show a construction of the lower and upper surfaces, respectively, of a by-pass capacitor bank which may be positioned between the base plate of the sub-assembly and the male portion of the plug system.
Figure 9:
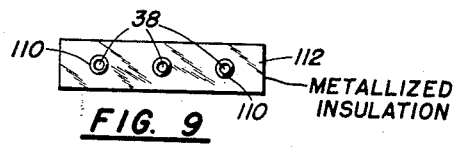

Attention is now directed to Figs. 8 and 9 which show an alternate construction for the lower and upper surfaces, respectively, of insulating strip 29. The insulating strip 29 of Fig. 4 is a perforated sheet of ordinary insulating material. The insulating strip 112, Figs. 8 and 9, which may be used instead of insulating strip 29, is a perforated sheet (perforations not shown) with good dielectric properties such as mica or ceramic. The surfaces of insulating strip 112 are metallized to form a bank of by pass capacitors. More specifically, the upper surface, Fig. 9, is continuously metallized and is adapted to contact base plate 22. The lower surface, Fig. 8, has only portions 37 thereof metallized. These are adapted to engage contact strips 13. The upper metallized surface, Fig. 9, has unmetallized areas 110 provided around holes 38 so that rods 23, which pass therethrough, will not be short circuited to base plate 22. The purpose of metallizing the opposite surfaces of insulating strip 112 is for providing a by-pass capacitor between each low frequency connection and ground (the base plate 22) for conducting to ground undesirable alternating current components. It is to be again noted, however, that the aforedescribed insulating strips may be metallized, as strips 112, or need not be metallized, as strips 29, depending on the requirements of the particular circuit under consideration.

Reference is now made to Figs. 1 and 10 for an explanation of how the low frequency female portion of the present plug system coacts with the above described low frequency male portion. Fig. 10 shows how the female portion 15 of the plug system can be coupled to a printed circuit plate 19. It is to be noted, however, that female plug 15 need not necessarily be used with a printed circuit. Contact springs 39, of female portion 15 have central portions 40 which are laminated between two insulating strips 41 and 42, which may consist of silicone-impregnated fibre glass or any other suitable insulating material. Each contact spring 39 has an arcuate spring portion 43 which is adapted to make good wiping contact with a respective contact strip 13 which is mounted on plug bar 12. Each contact spring 39 also has a tab 44 extending at right angles from central portion 40. Tabs 44 are adapted to be placed in electrical contact with leads 45, which are printed on printed circuit plate 19, by means of eyelets 104. Since insulating strips 41 and 42 are flexible, they are affixed to a rigid sheet metal strip 46 by means of eyelets 47 or any other suitable fastening means. Each rigid sheet metal strip 46 has lips 48 bent up from its lower edge to provide further rigidity for the sides of said female member 15 and to provide clearance for tabs 44 of contact springs 39. The metal strips 46 are affixed to coaxial connector blocks 49 by screws 113. Blank end block 50 can be used interchangeably with coaxial connector blocks 49 to provide rigidity for the sides of female member 15 when a coaxial connector block 49 is not required. The aforedescribed assembly provides a rigid receptacle for receiving plug bar 12 having contact strips 13 mounted thereon, and further provides wiping contact between contact springs 39 and contact strips 13 for the purpose of transmitting low frequencies from the printed circuit plate 19 to the electronic sub-assembly 10.

Attention is now directed to Figs. 1, 4, 5, and 10 for a description of how high frequencies are coupled from the chassis 16 of the electronic unit to the sub-assembly 10 by the instant plug system. The male portion of each high frequency connection is a coaxial plug assembly 14 consisting of coaxial plug shell 111 and center pin 52, the latter being rigidly affixed to base plate 22 by means of conventional glass to metal seals 24. Each coaxial plug shell 111 has an outwardly flared rim 53 which is adapted to fit into an oversized bore 54 in base plate 22. Spring washer 55 is interposed between the flared end of plug shell 111 and retaining ring 56 to insure good electrical contact between elements 111 and 22. The retaining ring 56 is pressed into base plate 22 to cause the spring washer 55 to hold flared rim 53 in contact with base plate 22. The base plate 22 may then have the portions thereof proximate to retaining ring 56 staked to securely hold retaining ring 56 on base plate 22. There is a clearance space between the inner peripheries of retaining ring 56 and washer 55. There is also a clearance space between the outer periphery of coaxial plug shell 14 and washer 55. It will be further noted that oversized bore 54 allows there to be a clearance space between the periphery of bore 54 and the outer periphery of rim 53. This construction permits coaxial plug shell 111 to float in a direction parallel to the plane of base plate 22 which in turn permits plug shell 111 to mate with the coaxial connector block 49 even though there might be some original slight misalignment between the two.

Figure 5:
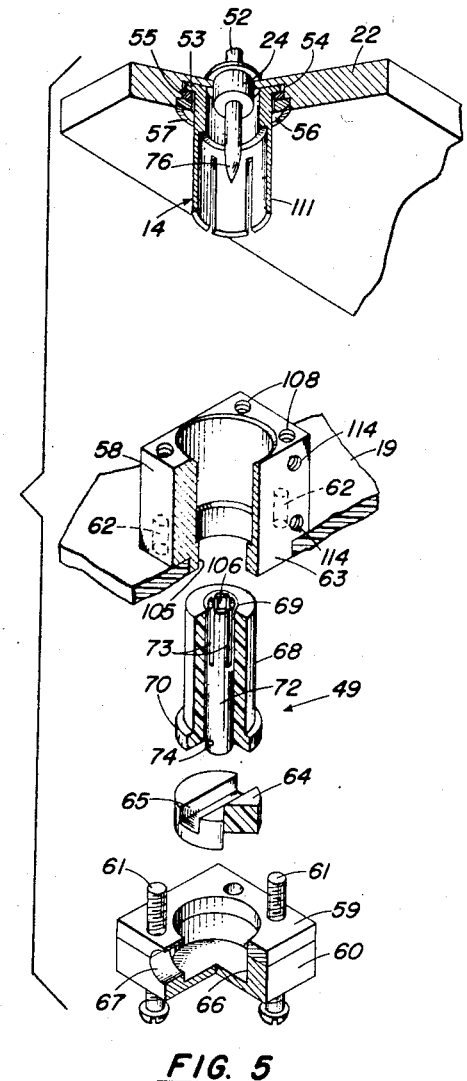
Fig. 5 is an exploded view which shows the details of both the male and female portions of the plug system which are used for high frequency connections.

The female portion of the high frequency connector will now be described, attention being directed to Figs. 5 and 10. The coaxial connector block 49, Fig. 10, consists of the following parts shown in exploded form in Fig. 5: A central body portion 58 is adapted to be joined to the upper and lower base portions 59 and 60, respectively, by means of bolts 61 which fit through holes in members 59 and 60 and thread into tapped holes 62 in central body portion 58. Tapped holes 114 in central body portion 58 are adapted to receive screws 113, Fig. 10, for holding the female portion 15 of the plug system in assembled relationship. It will be noted that central body portion 58 has a portion of reduced section 63 which fits through a mating cut out section (not numbered) in printed circuit plate 19. It can be seen that when parts 58, 59, and 60 are in their assembled position that the base portion 59 and central body portion 58 straddle printed circuit plate 19 to rigidly affix said coaxial connector block 49 to said printed circuit plate 19. An insulator disc 64 having slot 65 therein is adapted to seat in bore 66 of lower base portion 60 with said slot 65 aligned with opening 67 formed by base portions 59 and 60. A dielectric tube 68 having a bore 69 therein and a flared rim 70 seats on top of insulator disc 64. The flared rim 70 is of greater diameter than hole 105 in central body portion 58 and serves the function of holding dielectric tube 68 within the assembled coaxial connector block 49. The female contact 72 which coacts with center pin 52 is a piece of spring metal tubing 72 having slots 73 formed therein at one end which receives center pin 52. This end of female contact 71 is internally beveled at 106 to facilitate the entry of the end 76 of center pin 52. A diametral hole 74 is formed at the other end of female contact 71. In assembled condition of coaxial connector block 49, the end of the female contact 72 having hole 74 therein seats in slot 65 of insulator disc 64. The center lead 75, Fig. 10, of shielded cable 51 is soldered into hole 74. The outer shielding (not numbered) of shielded cable 51 is inserted into the opening 67 formed between base portions 59 and 60. When the screws 61 are tightened, the peripheral portions of opening 67 firmly clamp the shielded portions of cable 51. It is to be noted at this point that bore 69 in dielectric tube 68 is oversize with respect to female contact 72. It will be further noted that center pin 52 has its end 76 pointed. The pointed end construction of center pin 52 allows center pin 52 to enter female contact 72 in spite of any slight misalignment therebetween. The fact that the bore 69 is oversized with respect to female contact 72 allows said female contact to move slightly within bore 69 to permit proper alignment of center pin 52 and said female contact 72 in spite of any slight original misalignment therebetween prior to the plug-in operation.

It will be noted that the above described male and female high frequency plug elements, when plugged together electrically couple the outer shielded portion of cable 51 to ground (base plate 22) via base portions 59 and 60, central body portion 58, and coaxial plug shell 111. The center lead 75 of the shielded cable 51 is inserted into hole 74 of female contact 72 and soldered thereto, as mentioned above. When the plug system is plugged in, female contact 72 transmits high frequency electricity via center pin 52 to the required portions of sub-assembly 10.

It will be noted further that in the male portion of the high frequency plug the coaxial plug shell 111 has latitude of movement, as described above, whereas center pin 52 thereof is rigid. On the other hand, in coaxial connector block 49 the female contact 72 has latitude of movement, in the manner described above, whereas the central body portion 58 of the coaxial connector block 49 is rigid. When these constructions are viewed in combination, it can be seen that in spite of any slight misalignment prior to the plugging in of the male and female members that both the center lead connections and the shield connections will tend to align themselves as required. Each of the aforementioned alignments is obtained independently of each other. In addition, it will be noted that while center pin 52 is rigidly affixed to base plate 22 by a glass to metal seal 24, the above described latitude of movement of female member 72 allows easy plugging together of the male and female portions of the high frequency connectors while preserving the feature of allowing sub-assembly 10 to be hermetically sealed.

The structure for transmitting mechanical motion from the chassis 16 to the electronic sub-assembly 10 will now be described, attention being directed to Figs. 1, 2, 4, 10, 14 and 15. A drive shaft 77 is coupled to a source of mechanical motion (not shown). The source of mechanical motion may be a motor drive or a manually operated tuning knob. The end of shaft 77, having worm gear 78 affixed thereto, is journaled in gear housing 79. Worm gear 78 meshes with work gear 80, which in turn transmits rotary motion to tubular shaft 21 in the following manner: Shaft 21 has circular plate 81 affixed thereto. Gear 80 has a recess 84 therein in which circular plate 81 is positioned. It will be noted that circular plate 81 is of such diameter that it fits loosely within the recess 84 of gear 80. Circular plate 81 has two diametrically opposed slots 83 therein each of which straddles a respective pin 82 affixed to gear 80. Because of the foregoing structure plate 81 will rotate with gear 80 but will also be able to move on a diameter of gear 80 as governed by the pin and slot connections. Gear 80 has another circular recess 86 therein which coacts in complementary mating relationship with retaining member 85. Retaining member 85 has tubular extension 115 formed integrally therewith which is of lesser diameter than member 85 and which has tapped hole 92 therein. Tubular extension 115 fits through a hole (not numbered) in gear 80. Gear 80 is held in position in the gear housing 79 in the following manner: Cover plate 87 is affixed to gear housing 79 by means of threaded bolts such as 88. The body portion of bolt 89 extends through the hole in washer 90 and hole 91 in plate 87, and threads into tapped hole 92 in tubular extension 115. Thus gear 80 is rotatably affixed to plate 87 which is in turn affixed to gear housing 79. The purpose of the foregoing construction is to permit the tubular drive shaft 21 to align itself with drive shaft 17 when the electronic sub-assembly is plugged into the chassis 16. More specifically, because of the pin and slot connection between plate 81 and gear 80, plate 81 can slide relative to gear 80 in a direction parallel to a diameter of gear 80. The shaft 17 has a pin 92 extending therethrough which is adapted to be received in slots 93 of shaft 21. Tubular shaft 21 has two diametrically opposed slots 93 and circular plate 81 has two diametrically opposed slots 83. The diameter on which slots 93 fall is displaced by 90° from the diameter on which slots 83 fall. It will be noted that the mouth of hollow shaft 21 is flared out at 94 and that slot 93 is widened at the end of shaft 21 to permit easy entry of pin 92. Shaft 17 is of such diameter with respect to shaft 21 that it fits loosely therein. When the gear housing 79 is affixed to printed circuit plate 19 by threading bolts 88 into holes 95, shaft 21 extends through aperture 20 in the printed circuit plate 19. When shaft 17 and pin 92 are joined to shaft 21 and its associated structure an Oldham coupling is provided for transmitting mechanical motion from shaft 77 to shaft 17. It can readily be seen that the foregoing mechanical drive construction allows a plug-in type of mechanical drive in which exact alignment of the male and female members is not necessary in order to obtain satisfactory coupling.

In Fig. 4, the means for sealing shaft 17 against air leakage is shown. A housing 96 is formed integrally with base plate 22. Packing 97 which forms a rotary hermetic seal, is contained within housing 96 by threaded plug 98.

It can thus be seen that a plug system has been described which is capable of providing low frequency connections, high frequency connections, and a mechanical drive between a plug in type of electronic sub-assembly and the remainder of an electronic device. It is also to be noted that the male and female portions of the plug system are not required to be in exact alignment before mating because of the fact that the high frequency connections and mechanical linkages are self-aligning. It can also be seen that the low frequency connections do not require exact alignment for proper operation since all that is necessary is that each of the contact strips 13 engage the proper contact springs 39.

It is to be further noted that the coaxial connector blocks 49 are of such a design that they may be placed anywhere along the length of female portion 15 of the plug system, and that as many of the coaxial connector blocks 49 may be used as may be required in any particular application. This construction provides an electronic equipment designer with an unusual amount of flexibility in the location of his coaxial outputs. It is to be further noted that blank end block 50 is shown in Fig. 10 in addition to coaxial connector blocks 49. If only one coaxial connector block 49 is required in a plug assembly, instead of two as shown, then blank end block 50 may be used to give the female portion 15 of the plug system the required rigidity. In Fig. 10 blank end block 50 is shown as having hole 99 therein to accommodate exhaust nipple 100, Figs. 2 and 4, which is used for exhausting gases from electronic sub-assembly 10. In certain designs, where the exhaust nipple cannot be conveniently positioned anywhere else, this construction is desirable.

Attention is now directed to Fig. 11 which shows how the present plug system allows the electronic assembly to be air cooled. A plate 101 is suitably connected to the female portion of the plug system 15, Figs. 1 and 11, by means of screws 107 which fit into tapped holes 108 of the central body portions 58 of coaxial connector block 49. Holes 102 are formed in plate 101. In the electronic equipment chassis 16, these plates define a duct for cooling air. The holes 102 are of the proper size to meter the cooling air out of the duct and against the electronic sub-assembly 10 for cooling the latter. There is an alternative method of air cooling, not shown on the drawings, which can be used with the instant system. The plate 101 may be made of metal with fins on its under side directly in the airstream. In this manner plate 101 acts as a cold plate and the plugged in sub-assemblies are cooled by intimate contact with the cold plate. Another form of cooling which may be used is shown in Fig. 1. In this case liquid coolant is pumped through metal tubing 103 which is bonded to plate 101. This construction provides a liquid cooled cold plate.

Reference is now made to Fig. 12 which is a side view of Fig. 11. This view shows that the various parts of the system occupy different planes. This construction allows extremely great flexibility of electronic design. More specifically, coaxial cables 51 are brought to coaxial connector blocks 49 at one level. The mechanical drive shaft 77 is coupled to the gear housing at another level. The low frequencies are carried in the plane of printed circuit 19 which is still at another level. Thus it can be seen that since all of the aforementioned elements occupy different planes that this feature lends itself to unlimited flexibility in overcoming design layout and positioning problems.

Attention is now directed to Fig. 13 which illustrates fastening means for holding the male and female portions of the plug system in assembled relationship. This structure has been omitted from the other figures for the sake of clarity. It is to be noted that the drawings only show one fastening means but in actual practice a plurality of these fastening means are used. Each fastening means consists of a threaded stud 116 which is affixed to base plate 22 of electronic sub-assembly 10. Stud 116 extends through a hole 117 in plate 101 and is adapted to be engaged by bolt 110 which extends through hole 119 in printed circuit plate 19. Bolt 110 is threaded at 120 for a part of its length and mounts nut 121 thereon which causes bolt 110 to be loosely held in printed circuit plate 19 prior to the engagement of stud 116 and bolt 118. When it is desired to fasten the sub-assembly 10 in mated relationship with the chassis 16, stud 116 is threaded into tapped hole 122 of bolt 118 until the enlarged head 123 of bolt 118 bears against printed circuit plate 19. It is to be noted that the aforedescribed fastening assemblies may be positioned at any convenient place on the chassis 16, and may even extend through the female portion 15 of the plug system as long as they do not interfere with the plug bars 12.

It can thus be seen that the instant invention readily accomplishes the above enumerated objects.

Obviously many modifications and variations of the present invention are possible in the light of the above teachings. It is therefore to be understood that within the scope of the appended claims the invention may be practiced otherwise than as specifically described.

Having thus described my invention I claim:

1. A plug system for detachably joining a hermetically sealed electronic sub-assembly to the chassis of an electronic device comprising: a base plate affixed to said electronic sub-assembly; a first plug unit affixed to said base plate including a plug bar having low frequency contacts thereon; said first plug unit also having coaxial cable connecting means and means for transmitting rotational mechanical motion; hermetically sealed feed through members extending through said base plate in electrical contact with said low frequency contacts; hermetic seals mounted on said base plate in operative relationship with said coaxial cable connecting means and said means for transmitting rotational mechanical motion; a second plug unit affixed to said chassis including a receptacle having low frequency contacts therein which are adapted to mate with said low frequency contacts on said plug bar; said second plug unit also having coaxial cable connecting means and means for transmitting rotational mechanical motion; said first plug unit being adapted to mate with said second plug unit whereby low frequency coupling, coaxial coupling, and rotational mechanical coupling are achieved substantially simultaneously between said hermetically sealed sub-assembly and said electronic device upon the mating of said first and second plug units.

2. A plug system for detachably joining an electronic sub-assembly to the chassis of an electronic device comprising: a base plate affixed to said electronic sub-assembly; a first plug unit affixed to said base plate including a plug bar having low frequency contacts thereon; said first plug unit also having means for transmitting rotational mechanical motion and first coaxial cable connecting means; said first coaxial cable connecting means comprising a center pin rigidly affixed to said base plate and a coaxial plug shell movably affixed to said base plate; a second plug unit affixed to said chassis including a receptacle having low frequency contacts therein which are adapted to mate with said low frequency contacts on said plug bar; said second plug unit also having means for transmitting rotational mechanical motion and second coaxial connector means; said second coaxial connector means comprising a central body portion rigidly affixed to said chassis for making electrical contact with said coaxial plug shell, and a female contact movably mounted within and insulated from said central body portion for making electrical contact with said center pin; said first plug unit being adapted to mate with said second plug unit whereby low frequency coupling, coaxial coupling, and rotational mechanical coupling are achieved substantially simultaneously between said electronic device and said sub-assembly upon the mating of said first and second plug units.

3. A plug system as set forth in claim 2 wherein said first coaxial connector means includes hermetic sealing means for affixing said center pin to said base plate, a bore in said base plate concentric with said center pin, a rim on said plug shell having a diameter which is less than the diameter of said bore, and means in contact with said rim for retaining said rim in said bore to allow said plug shell to move relative to said base plate.

4. A plug system as set forth in claim 2 wherein said second coaxial connector means includes a base portion affixed to said chassis, said central body portion being affixed to said base portion, a dielectric tube held within said central body portion, a bore in said dielectric tube, said female contact being positioned within said last mentioned bore and having a diameter which is smaller than said bore whereby said female contact may move to receive said center pin.

5. A coaxial connector for coupling a hermetically sealed sub-assembly to a source of high frequency electricity supplied by an electronic device comprising: a base plate affixed to said sub-assembly; a coaxial connector block affixed to said electronic device; a coaxial plug assembly affixed to said base plate; said coaxial plug assembly comprising a center pin, hermetic sealing means rigidly affixing said center pin to said base plate, a bore in said base plate concentric with said center pin, a coaxial plug shell having a flared rim which is of smaller diameter than the diameter of said bore, and means in contact with said rim for holding said coaxial plug shell movably in contact with said base plate; said coaxial connector block comprising a base portion adapted to be affixed to said electronic device, a central body portion rigidly affixed to said base portion, a bore in said central body portion, a dielectric tube held within said last mentioned bore, a female contact adapted to fit loosely within said dielectric tube; said female contact thereby being capable of moving to receive said center pin, and said coaxial plug shell being capable of moving to contact said central body portion in the event of misalignment between said coaxial connector block and said coaxial plug assembly prior to the coupling of said sub-assembly and said electronic device.

6. A coaxial plug system for coupling a sub-assembly to a source of high frequency electricity supplied by an electronic device comprising a base plate affixed to said sub-assembly, a center pin rigidly mounted on said base plate and insulated therefrom, a coaxial plug shell movably mounted on said base plate in substantially concentric relationship with said center pin, a coaxial connector block mounted on said electronic device, a central body portion forming a portion of said coaxial connector block and rigidly mounted on said electronic device, said central body portion being adapted to make electrical contact with said plug shell, and a female contact movably mounted within said central body portion and insulated therefrom adapted to make electrical contact with said center pin, whereby upon mating of said coaxial plug said plug shell will move to make electrical contact with said central body portion and said female contact will move to make electrical contact with said center pin in the event of misalignment of said elements prior to assembly of said plug system.

7. A plug system for detachably joining an electronic sub-assembly to the chassis of an electronic device employing a printed circuit comprising a base plate affixed to said electronic sub-assembly, a first plug unit affixed to said base plate including a plug bar having low frequency contacts thereon, coaxial cable connecting means mounted on said base plate, and means for transmitting rotational mechanical motion mounted on said base plate, a second plug unit affixed to said chassis including a receptacle having low frequency contacts therein which are adapted to mate with said low frequency contacts on said plug bar, coaxial cable connecting means mounted in said receptacle, and means for transmitting rotational mechanical motion mounted on said chassis, said low frequency contacts on said receptacle being electrically coupled to said printed circuit, said first plug unit being adapted to mate with said second plug unit whereby low frequency coupling, coaxial coupling, and rotational mechanical coupling are achieved substantially simultaneously between said sub-assembly and said electronic device upon the mating of said first and second plug units.

8. A plug system as set forth in claim 7 wherein said receptacle is mounted on said printed circuit base plate.

9. A plug system as set forth in claim 8 wherein means are provided for cooling said sub-assembly, said means comprise a perforated plate mounted on said receptacle which in combination with said printed circuit base plate provide a duct for cooling air, said perforations metering said cooling air to said sub-assembly.

10. A plug system as set forth in claim 9 wherein coaxial cables are coupled to said coaxial cable connecting means mounted in said receptacle and a drive shaft is coupled to said means for transmitting rotational mechanical motion mounted on said chassis, said coaxial cables and said drive shaft and said printed circuit base plate occupying different planes.

References Cited in the file of this patent

UNITED STATES PATENTS

| | | |
|---|---|---|
| 1,380,330 | Ziegler | May 31, 1921 |
| 2,034,422 | Salzberg | Mar. 17, 1936 |
| 2,394,060 | Holmes | Feb. 5, 1946 |
| 2,432,120 | Neill | Dec. 9, 1947 |
| 2,604,583 | Torre | July 22, 1952 |
| 2,615,949 | Hecking | Oct. 28, 1952 |
| 2,641,635 | Skal et al. | June 9, 1953 |
| 2,648,804 | Steigerwalt et al. | Aug. 11, 1953 |
| 2,651,833 | Kernahan | Sept. 15, 1953 |
| 2,655,583 | Souter | Oct. 13, 1953 |
| 2,688,119 | Gere | Aug. 31, 1954 |
| 2,688,737 | Oskerka | Sept. 7, 1954 |
| 2,755,452 | Rogie | July 17, 1956 |
| 2,756,375 | Peck | July 24, 1956 |